3,157,567
FUNGICIDES
Irwin A. Prager, Naugatuck, and John A. Riddell, Hamden, Conn., assignors to United States Rubber Company, New York, N.Y., a corporation of New Jersey
No Drawing. Filed Sept. 12, 1962, Ser. No. 223,275
9 Claims. (Cl. 167—22)

The invention relates to agricultural chemical compositions that are useful as fungicides. The invention further relates to methods of treating plants that are subject to attack by fungi.

We have found that the N,N'-ethylene bis(N-nitroamides) of saturated aliphatic monocarboxylic acids having two to four carbon atoms are effective as fungicides. The chemicals of the present invention may be represented by the formula

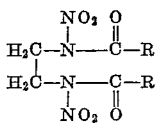

in which R is an alkyl radical having one to three carbon atoms. The N,N'-ethylene bis(N-nitroamides) of the saturated aliphatic monocarboxylic acids having two to four carbon atoms may be made by nitrating the N,N'-ethylene bis amide of the selected aliphatic acid. The N,N'-ethylene bis amides may be made by adding the appropriate acid chloride dropwise to an aqueous solution of ethylene diamine and caustic soda with cooling, or by adding the appropriate acid anhydride dropwise to aqueous ethylene-diamine with cooling. The nitration of the selected N,N'-ethylene bis amide may be accomplished by slowing adding the N,N'-ethylene bis amide to a mixture of acetic anhydride and concentrated nitric acid with cooling to below 5° C. and quenching the reaction mixture in ice water. The preparation of N,N'-ethylene bis(N-nitroacetamide) in this manner is described in Bachmann et al. Jour. Amer. Chem. Society 72, 3132–4 (1950). The N,N'-ethylene bis amides of butyric acids are new compounds.

The chemicals of the present invention may be applied to plants, which term includes various plant parts such as seeds, flowers, fruits, vegetables, roots and foliage, as a liquid or spray in a liquid carrier such as an organic solvent or water, or may be applied as a dust in admixture with a powered solid carrier such as the various mineral silicates, e.g. mica, talc, pyrophyllite, and clays. The chemicals of the invention may be prepared as fungical concentrates for subsequent dilution with water by mixing with surface-active agents which act as aids in dispersing the chemicals in water, and as wetting agents to improve the wetting properties when used as sprays. Aqueous dispersions of the chemicals may be prepared by directly dispersing the chemicals in water with the aid of a surface-active agent, or by first dissolving the chemicals in an organic solvent and then dispersing the solution of the chemical in water with the aid of a surface-active agent. The chemicals of the invention may be admixed with powered solid carriers, such as mineral silicates, together with a surface-active agent so that a wettable powder may be obtained which may be applied directly to plants, or which may be shaken up with water for application to the plants in that form. Such surface-active agents, which may be anionic, non-ionic or cationic surface-active agents, are well known and reference is made to U.S. Patent No. 2,547,724, columns 3 and 4, for detailed examples of the same.

The invention is illustrated in the following examples:

EXAMPLE 1

*Preparation of N,N'-Ethylene Bis(N-Nitrobutyramide)*

To 70 grams of 86% ethylene diamine and 80 grams of sodium hydroxide in 400 ml. of water were added 213 grams of n-butyryl chloride dropwise over 45 minutes. The temperature was kept below 75° C. during the addition. The mixture was then stirred for one-half hour and filtered. The filter cake was washed with water and dried. A yield of 83 grams of N,N'-ethylene bis-n-butyramide was obtained. Melting point 187–188° C.

To 80 ml. of 97.5% nitric acid was slowly added, with stirring, 80 ml. of acetic anhydride. Cooling was employed to keep the mixture below 5° C. To this nitrating mixture 30 grams of N,N'-ethylene bis-n-butyramide, prepared as above, was added in small portions over an hour. The resultant solution was kept at 0° C. to 5° C. for one hour and then poured, with stirring, onto 200 grams of ice. The N,N-ethylene bis(N-nitro-n-butyramide) precipitated as yellow crystals which were filtered, washed with water and dried. Melting point 50–51° C. After one recrystallization from acetonitrile, this material melted at 57–58° C. The N,N'-ethylene bis (N-nitroisobutyramide) may be made in a similar manner.

EXAMPLE 2

This example illustrates the effectiveness of the chemicals of the present invention as fungicides as tested against early blight of tomato.

One gram each of N,N'-ethylene bis(N-nitroacetamide) and N,N'-ethylene bis(N-nitro-n-butyramide) was ground with three ml. of acetone and 50 mg. of a non-ionic surface-active agent a condensation product of an alykl phenol and ethylene oxide). The acetone and surface-active agent were known to be inactive in the biological test run. The above mixtures were diluted to 500 ml. with water, giving suspensions containing 2000 p.p.m. (parts per million) of the chemicals. These suspensions were sprayed on duplicate four inch tomato plants (variety Clark's Early Special) using a gun-type sprayer which delivers 2.5 ml. per second. The treated plants were then placed in the greenhouse. Twenty-four hours later the treated plants and untreated control plants were inoculated with a suspension of *Alternaria solani* spores (3000 to 5000 spores per cc.) by means of a 20 second spray from an atomizer sprayer (delivery rate 1 ml. per second). The plants were then placed in a humidity chamber at a temperature of 75° F. overnight. In the morning the plants were transferred to the greenhouse and scored three days later. Scoring was calculated as percent disease control by an actual count of the lesions produced by the disease on the plants treated with the chemicals of the present invention and comparing these values to that obtained for the inoculated control.

The formula to determine percent control was:

$$100 - \left(\frac{\text{Ave. No. lesions on treated plant}}{\text{Ave. No. lesions on untreated plant}}\right) \times 100 = \text{percent control}$$

The N,N'-ethylene bis(N-nitroacetamide) and N,N'-ethylene bis(N-nitro-n-butyramide) each gave 100% control.

This application is a continuation-in-part of our application Serial No. 86,602, filed February 2, 1961, now abandoned.

In view of the many changes and modifications that may be made without departing from the principles underlying the invention, reference should be made to the appended claims for an understanding of the scope of the protection afforded the invention.

Having thus described our invention, what we claim and desired to protect by Letters Patent is:

1. A fungicidal composition comprising N,N'-ethylene bis(N-nitroamide) of a saturated aliphatic monocarboxylic acid having two to four carbon atoms, said composition containing a surface-active dispersing agent.

2. An agricultural chemical composition comprising N,N'-ethylene bis(N-nitroacetamide) and a surface-active dispersing agent.

3. An agricultural chemical composition comprising N,N'-ethylene bis(N-nitro-n-butyramide) and a surface-active dispersing agent.

4. A fungicidal dust for application to plants comprising a mixture of a powdered solid carrier and N,N'-ethylene bis(N-nitroamide) of a saturated aliphatic monocarboxylic acid having two to four carbon atoms.

5. A fungicidal dust for application to plants comprising a mixture of a powdered solid carrier and N,N'-ethylene bis(N-nitroacetamide).

6. A fungicidal dust for application to plants comprising a mixture of a powdered solid carrier and N,N'-ethylene bis(N-nitro-n-butyramide).

7. The method of controlling fungi on plants which comprises applying to plants N,N'-ethylene bis (N-nitroamide) of a saturated aliphatic monocarboxylic acid having two to four carbon atoms.

8. The method of controlling fungi on plants which comprises applying N,N'-ethylene bis(N-nitroacetamide) to plants.

9. The method of controlling fungi on plants which comprises applying N,N'-ethylene bis(N-nitro-n-butyramide) to plants.

References Cited in the file of this patent

UNITED STATES PATENTS

| | | |
|---|---|---|
| 2,856,429 | Sauer | Oct. 14, 1958 |
| 2,864,684 | Speziale | Dec. 16, 1958 |
| 2,965,534 | Darlington | Dec. 20, 1960 |
| 2,970,939 | Maitlen | Feb. 7, 1961 |
| 3,000,941 | Klager | Sept. 19, 1961 |
| 3,002,022 | Saunders | Sept. 26, 1961 |
| 3,085,940 | Tomcufcik et al. | Apr. 16, 1963 |
| 3,085,941 | Tomcufcik et al. | Apr. 16, 1963 |